(12) United States Patent
Shackles

(10) Patent No.: US 11,326,738 B2
(45) Date of Patent: May 10, 2022

(54) MOUNTING BRACKET WITH LINEAR ADJUSTMENT

(71) Applicant: Seating Excellence and Adaptive Therapeutic Systems Inc., Kars (CA)

(72) Inventor: Edward Shackles, Kars (CA)

(73) Assignee: SEATING EXCELLENCE AND ADAPTIVE THERAPEUTIC SYSTEMS INC., Kars (CA)

( * ) Notice: Subject to any disclaimer, the term of this patent is extended or adjusted under 35 U.S.C. 154(b) by 0 days.

(21) Appl. No.: 16/813,674

(22) Filed: Mar. 9, 2020

(65) Prior Publication Data
US 2021/0278034 A1 Sep. 9, 2021

(51) Int. Cl.
*F16M 11/00* (2006.01)
*F16M 13/02* (2006.01)

(52) U.S. Cl.
CPC ................ *F16M 13/022* (2013.01)

(58) Field of Classification Search
CPC ....... F16M 13/022; F16M 13/00; F16M 13/02
See application file for complete search history.

(56) References Cited

U.S. PATENT DOCUMENTS

| | | | | |
|---|---|---|---|---|
| 5,433,416 A | * | 7/1995 | Johnson | B65D 23/003 248/475.1 |
| 5,539,599 A | * | 7/1996 | Wilder | G11B 23/0316 360/133 |
| 7,422,182 B2 | * | 9/2008 | Tao | F16L 3/23 248/316.4 |
| 2008/0111038 A1 | * | 5/2008 | Carnevali | B60N 3/101 248/276.1 |

* cited by examiner

*Primary Examiner* — Amy J. Sterling
(74) *Attorney, Agent, or Firm* — Loza & Loza, LLP; Heidi Eisenhut

(57) ABSTRACT

The present invention provides a mounting bracket having a plate having a first surface and a second surface and a centrally oriented slot extending through the plate, the centrally oriented slot having a first slot section having a first width positioned in the first surface, the centrally oriented slot having a second slot section having a second width positioned in the second surface, the first width being wider than the second width, a carriage component, the carriage component having a first portion that abuts a second portion, the first portion having the first width, the second portion having the second width, the first portion slidably received in the first slot section, the second portion slidably received in the second slot section.

9 Claims, 8 Drawing Sheets

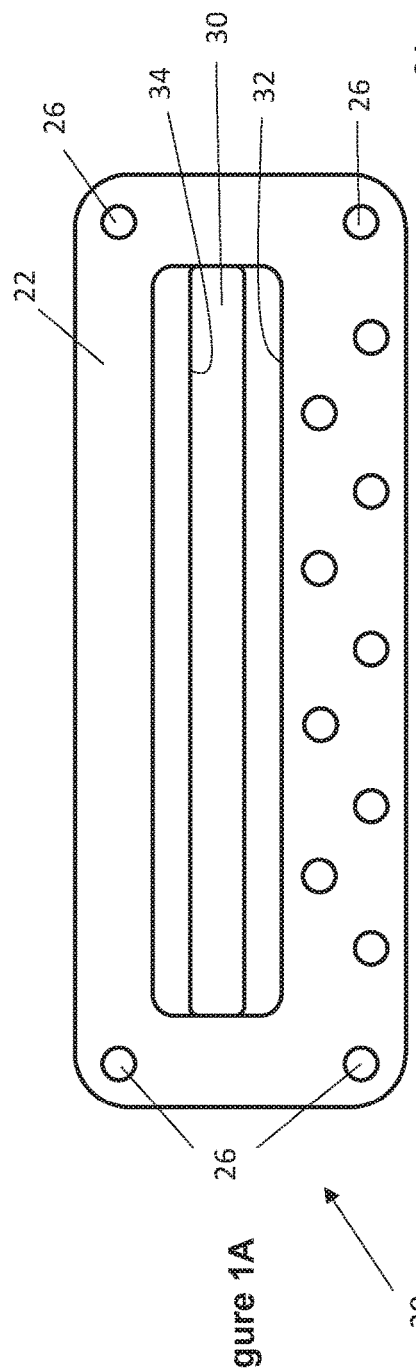
Figure 1A
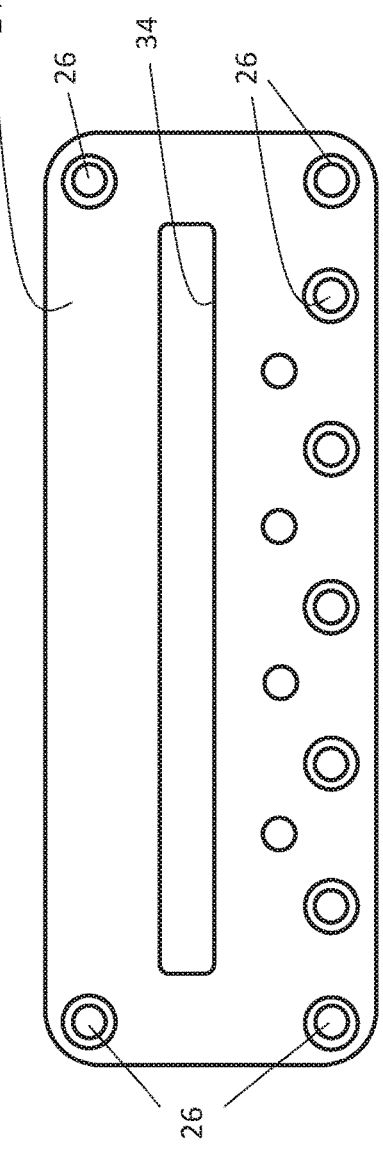
Figure 1B
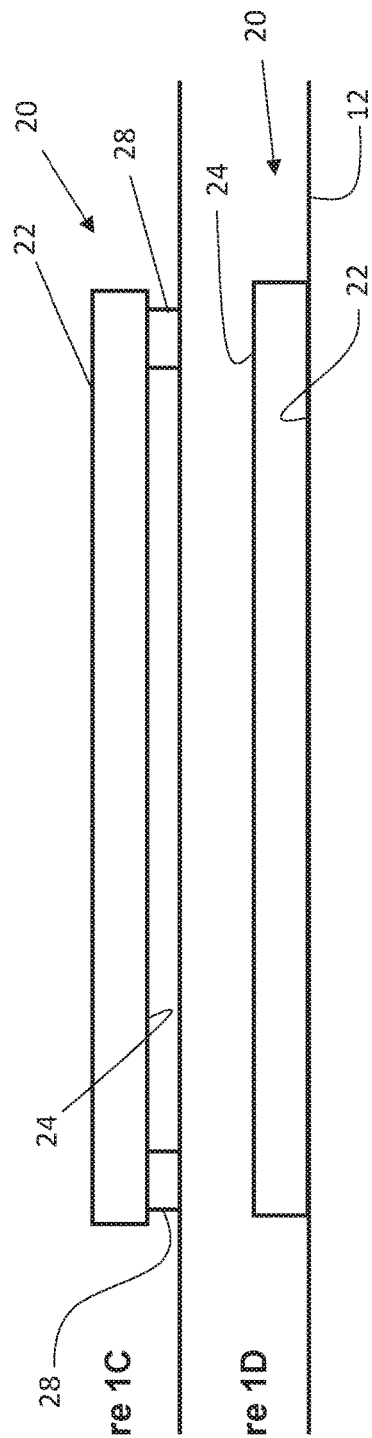
Figure 1C
Figure 1D

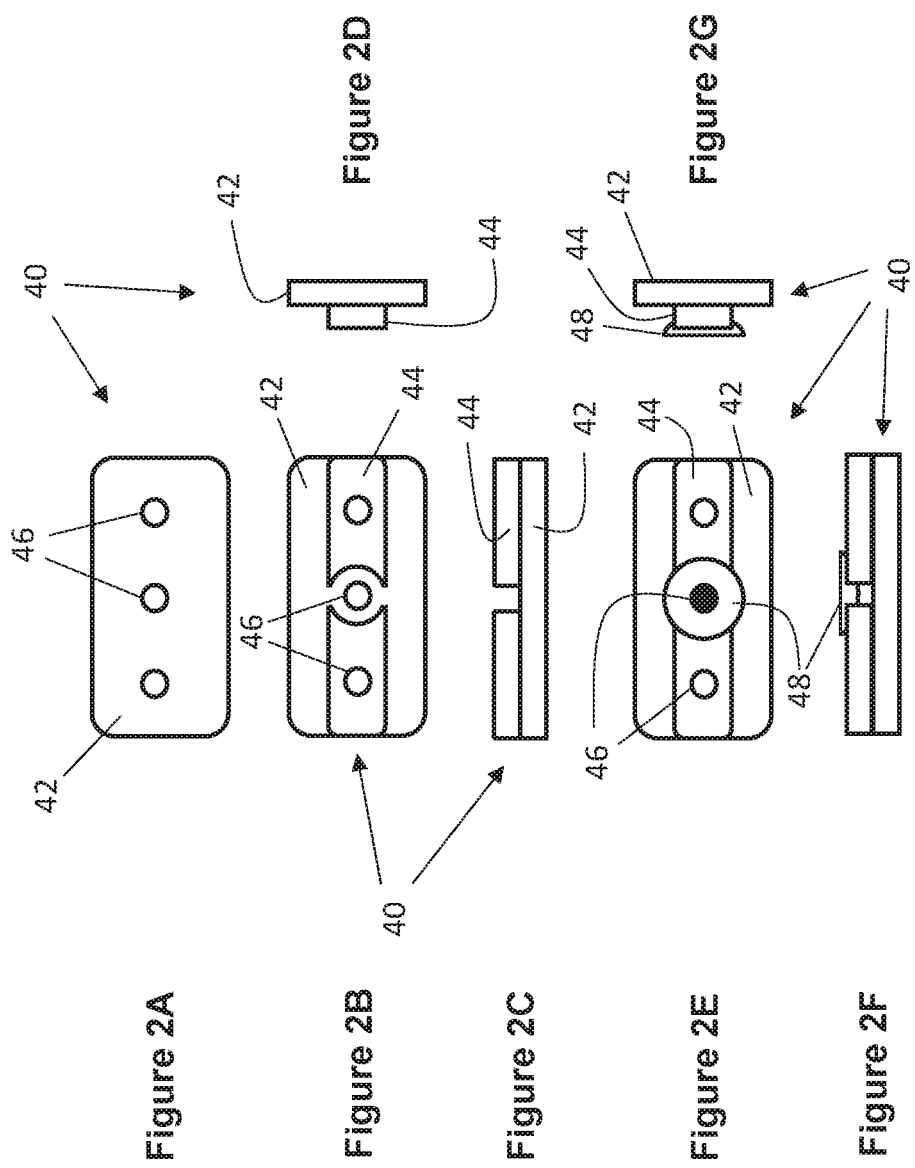

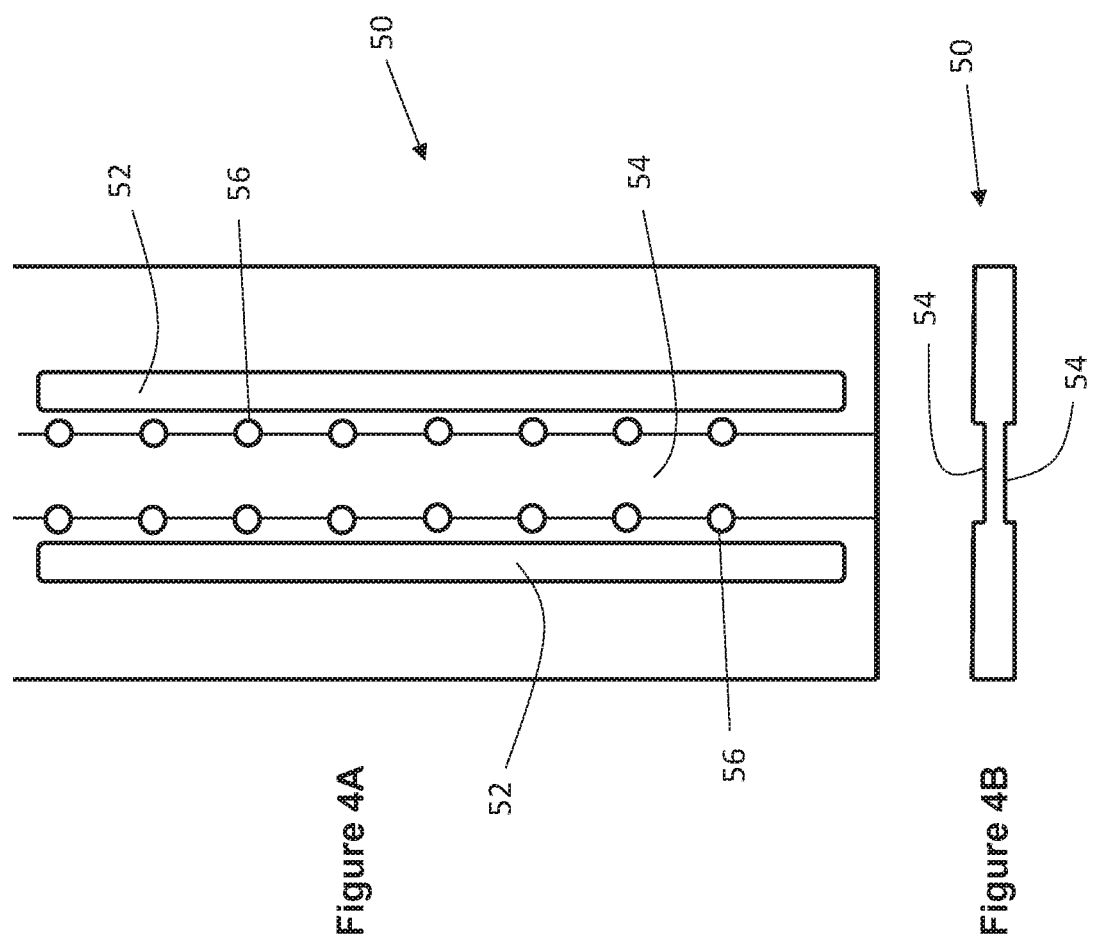

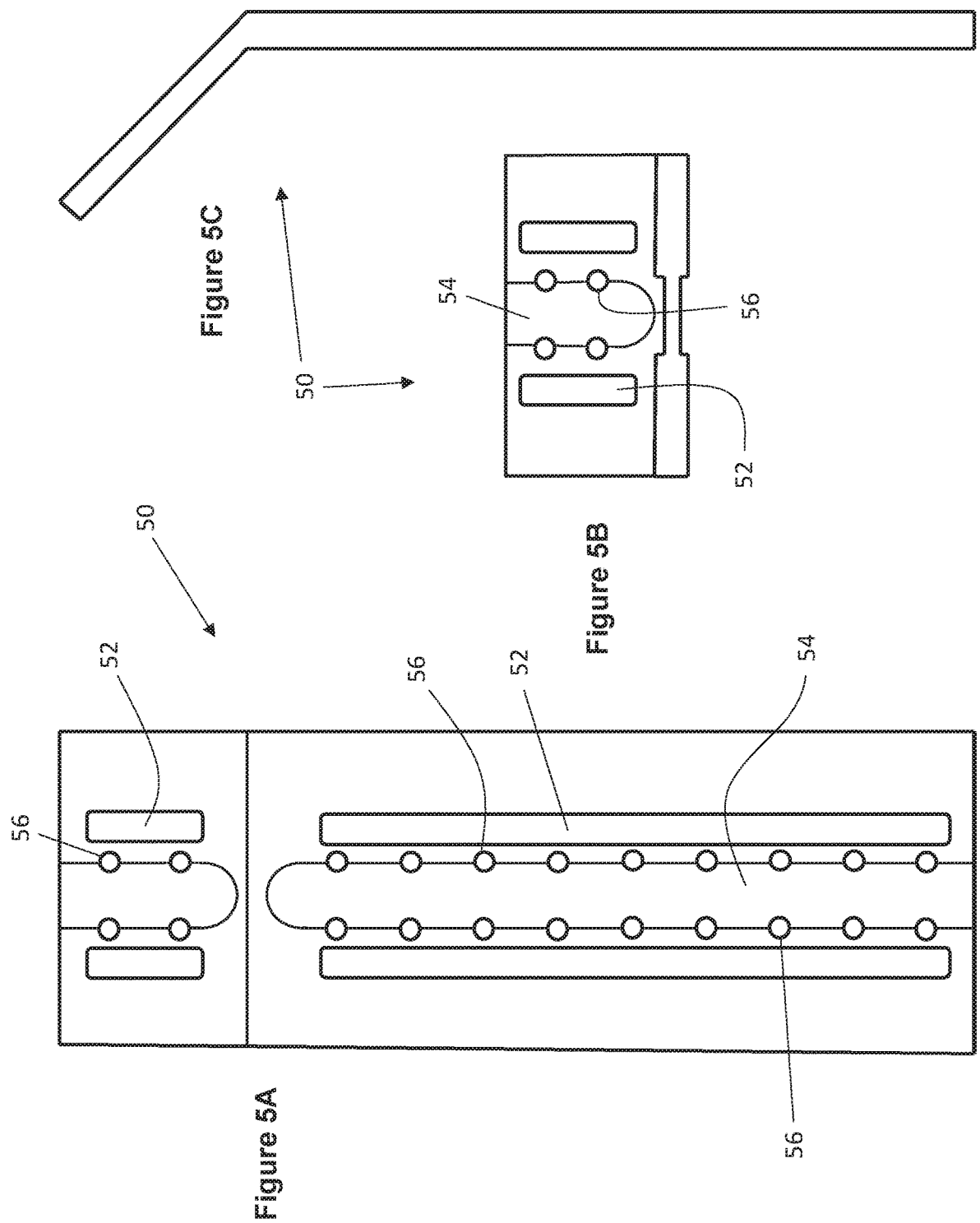

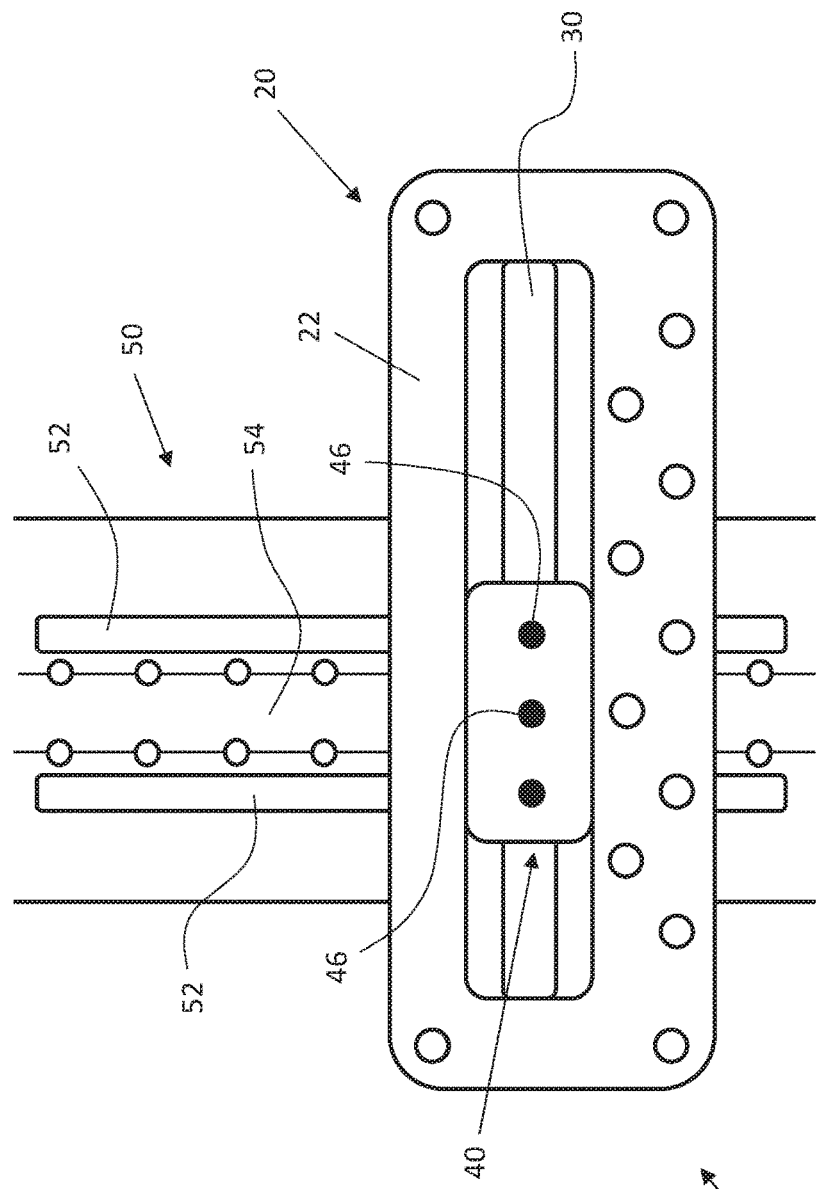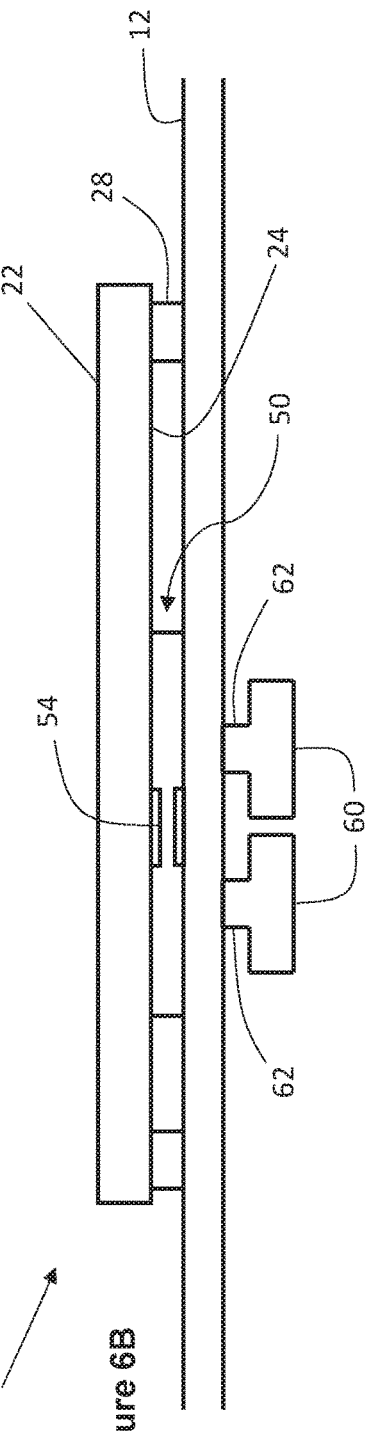
Figure 6A
Figure 6B

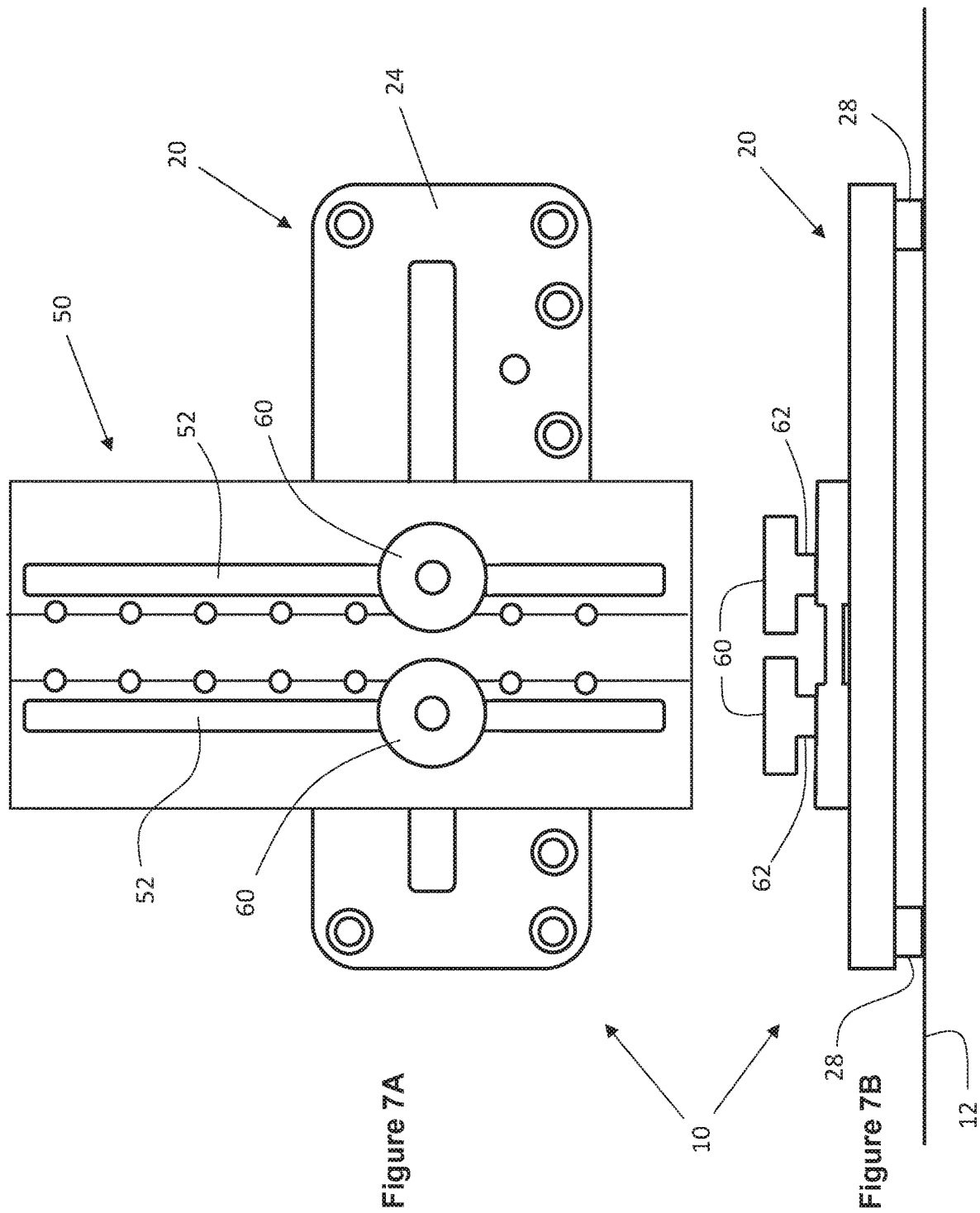

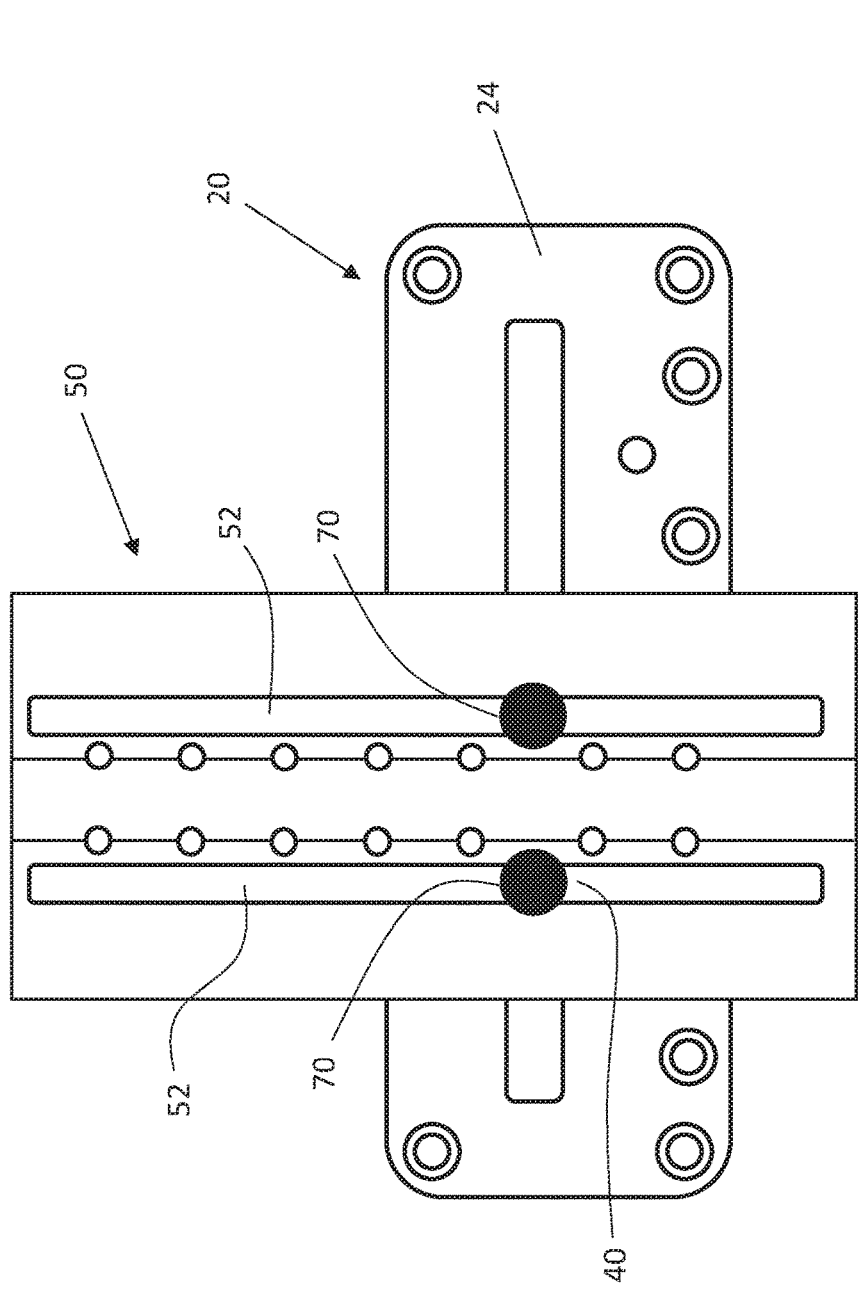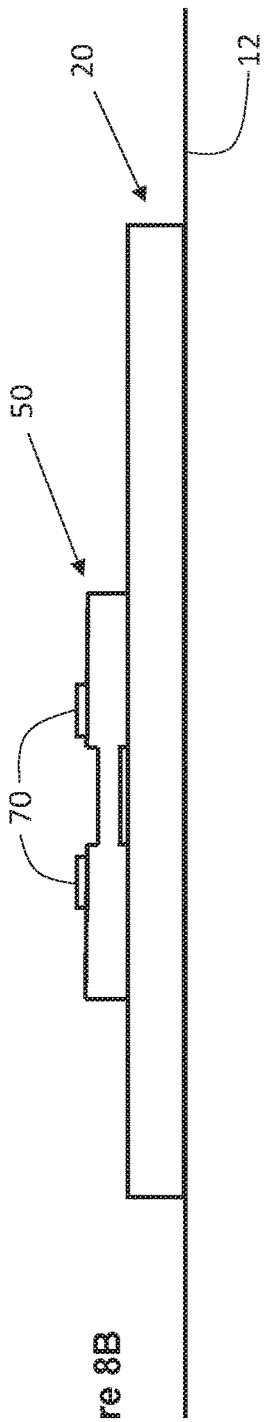
Figure 8A
Figure 8B

MOUNTING BRACKET WITH LINEAR ADJUSTMENT

FIELD

The present invention relates to systems and apparatuses for mounting various accessories to a generally flat surface.

BACKGROUND

There are a variety of situations where an accessory must be mounted to a generally flat underlying surface and where the particular end-user application requires that the position of the accessory must be adjusted even after the accessory has been securely mounted to the underlying surface.

For example, in the health care field, patients that use positioning and mobility devices such as wheelchairs often need to mount a number of accessories to their positioning and mobility devices to provide additional support (such as leg, pelvic, truncal and head supports) and to aid in positioning and overall comfort, or functionality to the generally flat rear surface of the positioning and mobility devices.

However, such end users frequently require adjustments to their seated position of the accessory over the course of time and sometimes daily. As such, although the accessory needs to be initially mounted to the front, rear, side and lateral surfaces of the positioning and mobility devices such as the wheelchair in a secure and robust manner, it is desirable to provide a degree of positional adjustability even after the accessory is securely mounted to the surface.

Moreover, such end users quite often are subjected to a variety of added challenges such as suffering from reduced mobility and/or dexterity or need to adjust the position of the accessory when wearing multiple layers of clothing, due to both indoor and outdoor activities. As such, it is desirable to provide a mounting system for an accessory wherein the position of the accessory can be adjusted by a caregiver, parent, medical professional and quite possibly the end user who potentially lacks strength, dexterity or having limited mobility.

Therefore, there is a need for a mounting bracket system for mounting a variety of accessories to a flat surface in a variety of robust manners such that the linear position of the mounted accessory can be easily adjusted by a caregiver, parent, medical professional and quite possibly the end user having limited strength or dexterity.

BRIEF SUMMARY

It is contemplated that the present disclosure provides a mounting bracket system for mounting a variety of accessories to a flat surface in a variety of robust manners such that the linear position of the mounted accessory can be easily adjusted by a caregiver, parent, medical professional and quite possibly the end user having limited strength or dexterity.

In at least one embodiment, the present invention can provide a mounting bracket for mounting to an underlying surface having a plate having a generally planar first surface and a generally planar second surface, the plate having a centrally oriented slot extending through the plate from the first surface to the second surface, the centrally oriented slot having a first slot section having a first width positioned in the first surface, the centrally oriented slot having a second slot section having a second width positioned in the second surface, the first width being wider than the second width, the plate having at least one plate bore extending through the plate from the first surface to the second surface, a carriage component, the carriage component having a first portion that abuts a second portion, the first portion having the first width, the second portion having the second width, the first portion slidably received in the first slot section, the second portion slidably received in the second slot section, the second portion of the carriage component having a retaining flange, the retaining flange slidably engaging a perimeter edge of the second slot portion, the carriage component having at least one carriage bore extending through the first portion and the second portion, such that the retaining flange slidably secures the carriage component in the centrally oriented slot, and wherein the carriage component is longitudinally translatable along the centrally oriented slot.

DESCRIPTION OF THE DRAWINGS

The present specification will be better understood in connection with the following FIGURES in which:

FIG. 1A is a front elevation view of a plate in accordance with at least one embodiment of the present invention;

FIG. 1B is a rear elevation view of the plate of FIG. 1A;

FIG. 1C is a bottom elevation view of the plate of FIG. 1A in an offset-mounted arrangement;

FIG. 1D is a bottom elevation view of the plate of FIG. 1A in a flush-mounted arrangement;

FIG. 2A is a front elevation view of a carriage in accordance with at least one embodiment of the present invention;

FIG. 2B is a rear elevation view of the carriage of FIG. 2A;

FIG. 2C is a bottom elevation view of the carriage of FIG. 2A;

FIG. 2D is a side elevation view of the carriage of FIG. 2A;

FIG. 2E is a front elevation view of the carriage of FIG. 2A having retaining means that are a cup washer;

FIG. 2F is a bottom elevation view of the carriage of FIG. 2E;

FIG. 2G is a side elevation view of the carriage of FIG. 2E;

FIG. 4A is a top elevation view of an accessory plate in accordance with at least one embodiment of the present invention;

FIG. 4B is an end elevation view of the auxiliary plate of FIG. 4A;

FIG. 5A is a top elevation view of another accessory plate in accordance with at least one embodiment of the present invention;

FIG. 5B is an end elevation view of the auxiliary plate of FIG. 5A;

FIG. 5C is a side elevation view of the auxiliary plate of FIG. 5A;

FIG. 6A is a top elevation view of an assembled plate, carriage and auxiliary plate in an offset-mount arrangement in accordance with at least one embodiment of the present invention;

FIG. 6B is a bottom elevation view of the assembled plate, carriage and auxiliary plate of FIG. 6A.

FIG. 7A is a top elevation view of an assembled plate, carriage and auxiliary plate in a top-mount arrangement in accordance with at least one embodiment of the present invention;

FIG. 7B is a bottom elevation view of the assembled plate, carriage and auxiliary plate of FIG. 7A.

FIG. 8A is a top elevation view of an assembled plate, carriage and auxiliary plate in a flush-mount arrangement in accordance with at least one embodiment of the present invention; and FIG. 8B is a bottom elevation view of the assembled plate, carriage and auxiliary plate of FIG. 8A.

DETAILED DESCRIPTION OF THE EMBODIMENTS

Figure 3A:
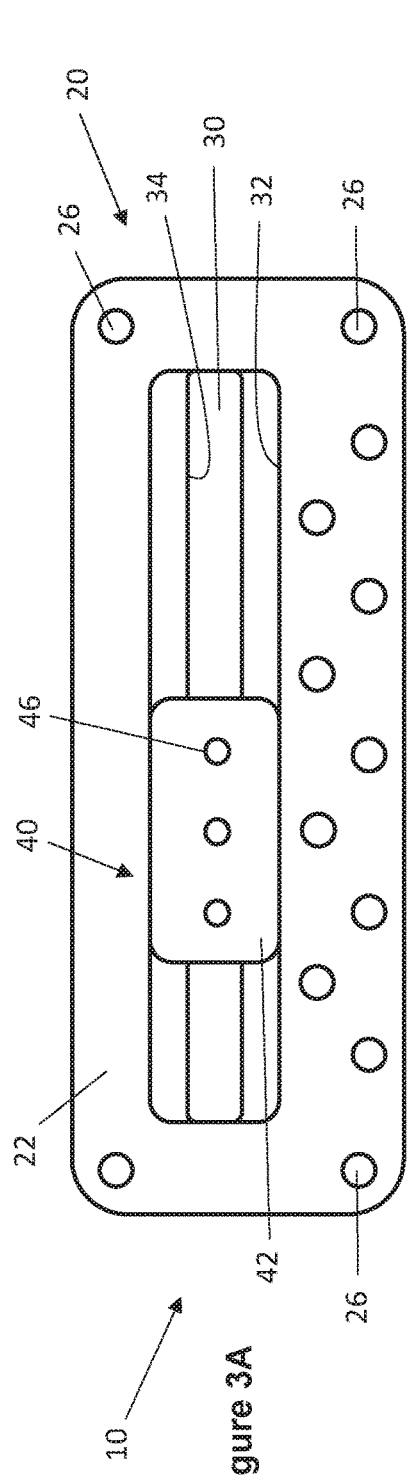
FIG. 3A is a front elevation view of an assembled plate and carriage in accordance with at least one embodiment of the present invention.

It is contemplated that the present disclosure can provide a mounting bracket system for mounting a variety of accessories to a flat surface in a variety of robust manners such that the linear position of the mounted accessory can be easily adjusted by a user having limited strength or dexterity.

It is contemplated that the components of the presently disclosed mounting bracket systems can be manufactured to any suitable dimensions using any suitable materials and by way of any suitable manufacturing technique, as will be readily appreciated by the skilled person.

It is contemplated that the presently disclosed mounting bracket systems can be mounted to an underlying surface in a variety of manners such that a user can adapt the present mounting bracket system depending on the needs of the particular end user application and the physical properties of the underlying mounting surface. In some embodiments it is contemplated that the present disclosure provides mounting bracket systems wherein the position of the mounted accessory can be adjusted after the accessory has been mounted without requiring any additional tools. In other embodiments, it is contemplated that an accessory can be mounted in a secure manner using appropriately threaded fasteners.

It is contemplated that the present invention includes a plate and a carriage. It is contemplated that the plate includes a slot that extends from a generally planar first surface to a generally planar second surface and a slot that extends through the plate from the first surface to the second surface.

Moreover, it is contemplated that the plate includes at least one bore that extends through the plate from the first surface to the second surface. In some embodiments, it is contemplated that the bore may be threaded, counterbored or countersunk as required by the end-user application.

In this way, it is contemplated that the plate may be secured to the underlying surface and/or an accessory may be secured to the plate by way of the bore.

It is contemplated that the plate can be mounted such that it is flush mounted directly to an underlying surface, and in other embodiments it is contemplated that the plate is mounted in an offset manner relative to the underlying surface. In offset mounting arrangements it is contemplated that spacers can be provided between the second surface of the plate and the underlying surface. In flush mounted arrangements, it is contemplated that the first surface or the second surface may be mounted such that the surface directly abuts the underlying surface, as will be discussed in further detail below.

It is contemplated that the slot is a dual width slot. In other words, it is contemplated that the slot has a first slot section having a first width in the first surface that communicates with a second slot section having a second width in the second surface. In some embodiments, it is contemplated that the first width is wider than the second width, as will be discussed in further detail herein.

It is also contemplated that the carriage includes a first portion and a second portion. In at least one embodiment, it is contemplated that the first portion and the second portion are generally rectangular in shape. It is contemplated that the first portion and the second portion are aligned along a longitudinal axis such that the first portion abuts the second portion. In some embodiments, the carriage is formed of two or more components suitably joined together and in other embodiments it is contemplated that the carriage is a single unitary component.

Moreover, it is contemplated that the first portion has a first width and the second portion has a second width. It is contemplated that the first width of the first portion of the carriage is approximately equal to the first width of the first slot section and the second width of the second portion of the carriage is approximately equal to the second width of the second slot section.

In this way, it is contemplated that the first portion of the carriage is slidably received in the first slot section and the second portion of the carriage is slidably received in the second slot section such that the carriage can slide within the slot and therefore the carriage can be translated laterally relative to the slot and plate.

It is contemplated that in some embodiments the outer surface of the second portion of the carriage is slightly recessed relative to the second surface of the plate when the carriage is fitted within the slot in the plate. In other embodiments it is contemplated that the outer surface of the second portion of the carriage is approximately flush relative to the second surface of the plate when the carriage is fitted within the slot in the plate.

Moreover, it is contemplated that the carriage includes at least one bore that extends through the carriage through the first portion to the second portion. In some embodiments, it is contemplated that the bore may be threaded, counterbored or countersunk as required by the end-user application. In this way, it is contemplated that an accessory (or an accessory plate) may be secured to the carriage by way of the bore, as discussed in further detail herein.

In some embodiments, it is contemplated that retaining flange may be provided on the second portion of the carriage. In these embodiments, it is contemplated that the retaining flange is wider than the second width of the second slot section such that the carriage is retained within the slot by the retaining flange. In some embodiments, the retaining flange is a cup washer that is mounted to a bore in the carriage that has been counterbored or countersunk to accommodate the shape of the cup washer.

It will be appreciated that in other flush mounted embodiments, a retaining flange is not required as the first surface of the plate can be oriented such that it directly abuts the underlying surface, thereby slidably retaining the carriage in the slot between the first surface and the underlying surface.

In some embodiments, it is contemplated that an accessory plate can be provided in order to improve the functionality of the present mounting bracket system. In at least one embodiment, it is contemplated that the accessory plate can have at least one longitudinally oriented slot that extends through the accessory plate. In some embodiments, it is contemplated that the accessory plate can have an angled cross-sectional profile, although other arrangements are also contemplated.

In some embodiments, it is contemplated that the accessory plate has a recessed groove that is positioned in a centrally and longitudinally-oriented manner on the accessory plate. It is contemplated that the recessed groove is sized to accommodate the retaining means (which can be a cup washer) in certain mounting arrangements, as will be discussed in further detail herein.

Moreover, it is contemplated that the accessory plate can include at least one bore that extends through the accessory plate. In some embodiments, it is contemplated that the bore may be threaded, counterbored or countersunk as required by the end-user application. In this way, it is contemplated that an accessory may be secured to the accessory plate by way of the bore. It is contemplated that a nearly limitless number of accessories can be secured to the accessory plate which can be in turn secured to the carriage of the mounting bracket system.

Turning to FIGS. 1A to 1D, one embodiment of a plate 20 for use in connection with the present disclosure is illustrated. In this embodiment, the mounting bracket system includes plate 20 having a generally planar first surface 22 and a generally planar second surface 24. A centrally oriented slot 30 is provided that has a first slot section 32 and a second slot section 34.

As can be seen in FIG. 1A, it is contemplated that first slot section 32 is wider than the second slot section 34. It is further contemplated that a number of bores 26 are provided that extend through plate 20 from the first surface 22 to the second surface 24. As discussed herein, it is contemplated that each bore 26 can be counterbored, countersunk or threaded as required by the particular end user application.

In some embodiments, it is contemplated that bores 26 bores 26 located adjacent the corners of the plate 20 are counterbored on second surface 22 of plate 20 to ensure that second surface 22 has no protruding fasteners, as can be seen in FIG. 1B and as will be appreciated by the skilled person.

In some embodiments, it is contemplated that plate 20 is mounted in an offset arrangement relative to an underlying surface 12 and in these embodiments it is contemplated that spacers 28 are provided to space plate 20 relative to underlying surface 12, as can be seen in FIG. 1C. In other embodiments, it is contemplated that plate 20 can be mounted in a flush arrangement wherein the first surface 22 or the second surface 24 directly abuts underlying surface 12, as can be seen in FIG. 1D.

Turning to FIGS. 2A to 2G, one embodiment of a carriage 40 for use in connection with the present disclosure is illustrated. In this embodiment, the mounting bracket system includes carriage 40 that has a first portion 42 that abuts a second portion 44. It is contemplated that first portion 42 has a first width that is approximately equal to the width of first slot section 22 and that second portion 44 has a second width that is approximately equal to the width of first slot section 24.

It is further contemplated that a number of bores 46 are provided that extend through carriage 40 from the first portion 42 to the second portion 44. As discussed herein, each bore 46 can be counterbored, countersunk or threaded as required by the particular end user application, as can be seen in FIGS. 2B and 2C where a centrally located bore 46 is counterbored the entire depth of second portion 34 of carriage 30.

As can be seen in FIGS. 2E to 2G, in this embodiment a retaining flange that is a cup washer 48 is secured to carriage 40 by way of a mechanical faster that is inserted through cup washer 48 into a centrally located, counterbored bore 46. As discussed herein, it is contemplated that the width of cup washer 48 is wider than the second width of second portion 44 of carriage 40 and the second width of second slot section 24 of plate 20.

Turning to FIGS. 3A to 3D, one embodiment of a mounting bracket 10 for use in connection with the present disclosure is illustrated. In this embodiment, mounting bracket 10 includes a carriage 40 that is slidably received in slot 30 of plate 20. Plate 20 has a generally planar first surface 22 and a generally planar second surface 24. A centrally oriented slot 30 is provided that has a first slot section 32 and a second slot section 34. As can be seen in FIG. 3A, it is contemplated that first slot section 32 is wider than the second slot section 34. It is further contemplated that a number of bores 26 are provided that extend through plate 20 from the first surface 22 to the second surface 24. As discussed herein, each bore 26 can be counterbored, countersunk or threaded as required by the particular end user application.

Figure 3B:
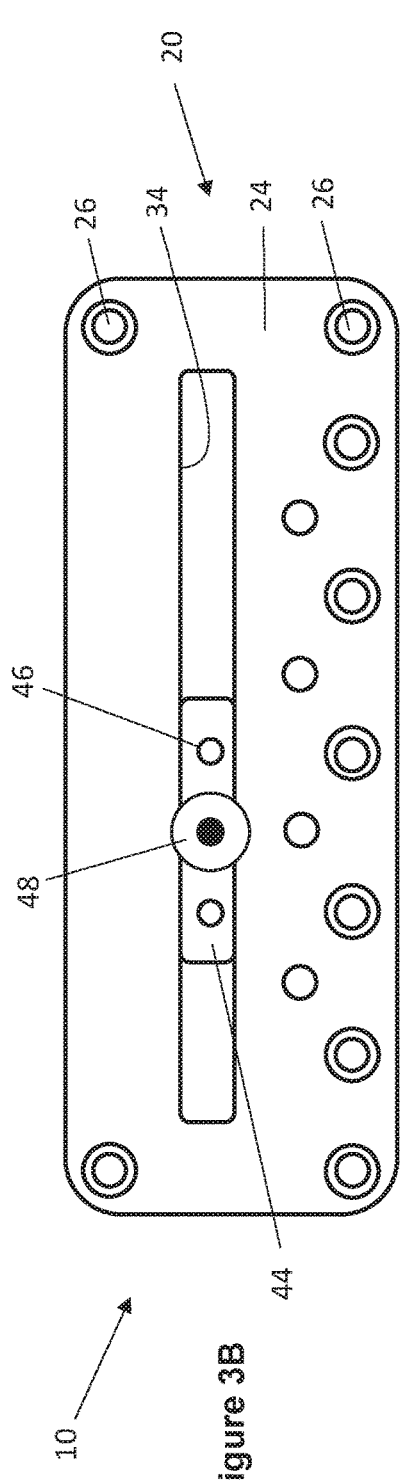
FIG. 3B is a rear elevation view of the assembled plate and carriage of FIG. 3A.
Figure 3C:
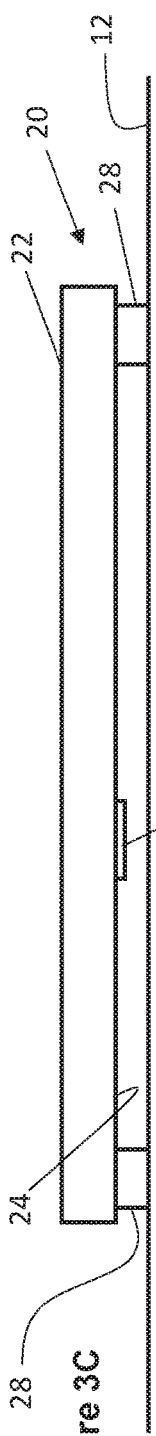
FIG. 3C is a bottom elevation view of the assembled plate and carriage of FIG. 3A.
Figure 3D:
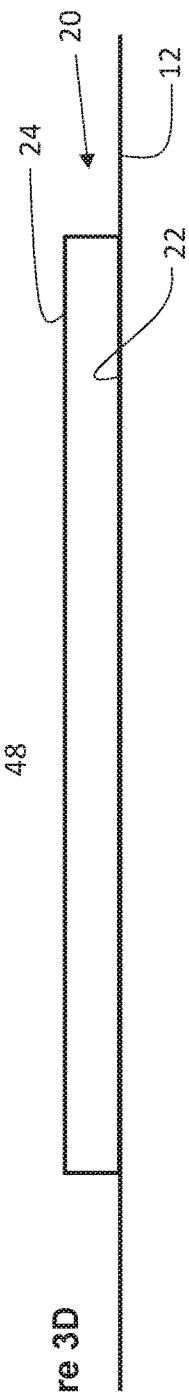
FIG. 3D is a bottom elevation view of the assembled plate and carriage of FIG. 3A in a flush-mounted arrangement.

In some embodiments, it is contemplated that plate 20 is mounted in an offset arrangement relative to an underlying surface 12 and in these embodiments it is contemplated that spacers 28 are provided to space plate 20 relative to underlying surface 12, as can be seen in FIG. 3C. In other embodiments, it is contemplated that plate 20 can be mounted in a flush arrangement wherein the first surface 22 or the second surface 24 directly abuts underlying surface 12, as can be seen in FIG. 3D.

In this embodiment, carriage 40 has a first portion 42 that abuts a second portion 44. It is contemplated that first portion 42 has a first width that is approximately equal to the width of first slot section 22 and that second portion 44 has a second width that is approximately equal to the width of first slot section 24. It is further contemplated that a number of bores 46 are provided that extend through carriage 40 from the first portion 42 to the second portion 44. As discussed herein, each bore 46 can be counterbored, countersunk or threaded as required by the particular end user application.

As can be seen in FIG. 3B, in this embodiment a retaining flange that is a cup washer 48 is secured to carriage 40 by way of a mechanical faster that is inserted through cup washer 48 into a centrally located, counterbored bore 46. As discussed herein, it is contemplated that the width of cup washer 48 is wider than the first width of first portion 42 of carriage and first width of first slot section 22.

In this way, it is contemplated that carriage 40 is slidably received in slot 30 of plate 20 such that carriage can be translated along slot 30 as required. In some embodiments, it is contemplated that cup washer 48 is sized such that it is wider than second slot section 24. In this way, carriage 40 is securely yet slidably retained within slot 30 of plate 20, as can be seen in FIGS. 3B and 3C. It will be appreciate that this is particularly useful in offset mounting arrangements.

Turning to FIGS. 4A and 4B, one embodiment of an accessory plate 50 for use in connection with the present disclosure is illustrated. In this embodiment, accessory plate 50 is generally planar and has a generally rectangular shape. It is contemplated that accessory plate 50 has at least one longitudinally extending slot 52 for receiving a fastener (not shown) that extend through accessory plate 50 and at least one bore 56. In an analogous manner as discussed above, it is contemplated that each bore 56 can be counterbored, countersunk or threaded as required by the particular end user application. It is further contemplated that auxiliary plate 50 includes at least one longitudinally oriented recessed groove 54 that is sized to receive a retaining flange of carriage 40 in some embodiments, as will be discussed in further detail herein.

Turning to FIGS. 5A to 5C, another embodiment of an accessory plate 50 for use in connection with the present disclosure is illustrated wherein accessory plate 50 has an angled cross-sectional profile as can be seen in FIG. 5C. In this embodiment, accessory plate 50 has two portions that are each provided in a generally rectangular shape. It is contemplated that accessory plate 50 has at least one longitudinally extending slot 52 for receiving a fastener (not shown) that extend through accessory plate 50 and at least one bore 56. In an analogous manner as discussed above, it is contemplated that each bore 56 can be counterbored, countersunk or threaded as required by the particular end user application. It is further contemplated that auxiliary plate 50 includes at least one longitudinally oriented recessed groove 54 that is sized to receive a retaining flange of carriage 40 in some embodiments, as will be discussed in further detail herein.

It is contemplated that each of bore 26, 46 and 54 are generally analogous and can be counterbored, countersunk or threaded as required by the particular end user application. Moreover, it is contemplated that all bores discussed herein can be spaced in grid-like pattern in a consistent manner (such as, for example, on 1"/2.54 cm centers) such that the resulting system provides additional predictability and functionality for the end user, as all cooperating components can be manufactured having bores that are similarly spaced in order to match the bores provided in any of plate 20, carriage 40 and/or auxiliary plate 50 as required by the end-user application.

Embodiment 1: Offset Mount Plate, Flush Mount Accessory Plate

Turning to FIGS. 6A and 6B, at least one embodiment of a mounting bracket 10 that is installed in an offset manner and wherein accessory plate 50 is installed between underlying surface 12 and second surface 24 of plate 20. In this embodiment, a plurality of spacers 28 is provided between second surface 24 of plate 20 and underlying surface 12. It is contemplated that underlying surface 12 is relatively thin, and a threaded post having a turn wheel 60 is inserted through a bore (not shown) provided in underlying surface 12, through slot 52 of accessory plate 50 and into bore 46 of carriage 40. In this embodiment, it is contemplated that turn wheel 60 has a shoulder 62 and bore 46 is threaded. As such and as will be readily appreciated by the skilled person, as the threaded post and turn wheel 60 are rotated in a clockwise manner (for standard right hand threading) shoulder 62 will bear against underlying surface 12 and the carriage 40 and plate 20 will be drawn closer to underlying surface 12, thereby squeezing accessory plate 50 between underlying surface 12 and second surface 24 of plate 20 in a secure but releasable manner. In this embodiment, it is further contemplated that carriage 40 further includes a retaining flange that is a cup washer (not shown) secured to bore 46 in carriage 40 that retains carriage 40 in slot 30 of plate 20. In this embodiment, it is contemplated that cup washer (not shown) is slidably received in groove 54 of accessory plate 50.

Embodiment 2: Offset Mount Plate, Offset Mount Accessory Plate

Turning to FIGS. 7A and 7B, at least one embodiment of a mounting bracket 10 is illustrated that is installed in an offset manner and wherein accessory plate 50 is mounted directly to carriage (not shown). In this embodiment, a plurality of spacers 28 is provided between first surface 22 of plate 20 and underlying surface 12. It will be appreciated that in this embodiment, plate 20 is "reversed" in that second surface 24 of plate 20 faces outwardly and first surface 22 of plate 20 faces underlying surface 20.

In this embodiment, it is contemplated that a threaded post having a turn wheel 60 is inserted through slot 52 of accessory plate 50 and into bore (not shown) of carriage (not shown). In this embodiment, it is contemplated that turn wheel has a shoulder 62 and bore 46 is threaded. As such and as will be readily appreciated by the skilled person, as the threaded post and turn wheel 60 are rotated in a clockwise manner (for standard right hand threading) shoulder 62 will bear against accessory plate 50 and in turn accessory plate 50 will be secured to carriage (not shown) in a secure but releasable manner.

In this embodiment, it is further contemplated that carriage 40 can further includes a retaining flange that is a cup washer 48 is secured to bore (not shown) in carriage (not shown) that retains carriage (not shown) in slot 30 of plate 20.

Embodiment 3: Flush Mount Plate, Offset Mount Accessory Plate

Turning to FIGS. 8A and 8B, at least one embodiment of a mounting bracket 10 that is installed in a flush manner to underlying surface 12 and wherein accessory plate 50 is mounted directly to carriage 40. In this embodiment, first surface 22 of plate 20 directly abuts underlying surface 12. It will be appreciated that in this embodiment, plate 20 is "reversed" in that second surface 24 of plate 20 faces outwardly and first surface 22 of plate 20 faces and directly abuts underlying surface 20.

It is contemplated that a threaded fastener 70 is inserted through slot 52 of accessory plate 50 and into bore (not shown) of carriage 40. In this embodiment, it is contemplated that bore (not shown) of carriage 40 is threaded. As such and as will be readily appreciated by the skilled person, as threaded fastener 70 is rotated in a clockwise manner (for standard right-hand threading) accessory plate 50 will be secured to carriage 40 in a secure but releasable manner.

In this way, it will be appreciated that an accessory plate (or, in other embodiments, any accessory having appropriately sized and positioned bores) can be secured to the carriage and translated along the slot provided in the plate and secured in place (by, for example, turn wheels or threaded fasteners, depending on the embodiment) and as such the linear position of the mounted accessory (or accessory plate) can be easily adjusted by a user having limited strength or dexterity. Moreover, it is contemplated that the mounting bracket can be secured to an underlying surface in a variety of manners depending on the needs of the end-user application.

The embodiments described herein are intended to be illustrative of the present compositions and are not intended to limit the scope of the present disclosure. Various modifications and changes consistent with the description as a whole and which are readily apparent to the person of skill in the art are intended to be included. The appended claims should not be limited by the specific embodiments set forth in the examples but should be given the broadest interpretation consistent with the description as a whole.

What is claimed is:

1. A mounting bracket for mounting to an underlying surface comprising:
    a plate having a generally planar first surface and a generally planar second surface, the plate having a centrally oriented slot extending through the plate from the first surface to the second surface, the centrally oriented slot having a first slot section having a first width positioned in the first surface, the first slot section defined by a first continuous perimeter wall, the centrally oriented slot having a second slot section having a second width positioned in the second surface, the second slot section defined by a second continuous perimeter wall, the first width being wider than the second width, the first continuous perimeter wall oriented parallel to the second continuous perimeter wall, each of the first continuous perimeter and the second continuous perimeter wall oriented generally perpendicularly to each of the generally planar first surface and the generally planar second surface, the plate having at least one plate bore extending through the plate from the first surface to the second surface;

a carriage component, the carriage component having a first portion that abuts a second portion, the first portion having the first width, the second portion having the second width, the first portion slidably received in the first slot section, the second portion slidably received in the second slot section, the carriage component having at least one carriage bore extending through the first portion and the second portion and a retaining flange adapted to slidably retain the carriage component within the centrally oriented slot;

wherein the carriage component is longitudinally translatable along the centrally oriented slot; and wherein the retaining flange is secured to the carriage by way of a threaded mechanical fastener.

2. The mounting bracket of claim 1, the second portion of the carriage component having a retaining flange, the retaining flange slidably engaging a perimeter edge of the second slot portion, wherein the retaining flange slidably secures the carriage component in the centrally oriented slot.

3. The mounting bracket of claim 2 wherein the retaining flange is a cup washer.

4. The mounting bracket of claim 1 further comprising a plurality of spacers, the plurality of spacers positioned between the generally planar second surface of the plate and the underlying surface.

5. The mounting bracket of claim 1 wherein at least one of the at least one plate bore and the at least one carriage bore further comprises at least one of a counterbored and countersunk portion.

6. The mounting bracket of claim 1 wherein at least one of the at least one plate bore and the at least one carriage bore is threaded.

7. The mounting bracket of claim 1 wherein at least one of the first portion and the second portion have a shape selected from the group consisting of: an obround and a rounded rectangular.

8. The mounting bracket of claim 1 wherein at least one of the first slot section and the second slot section have a shape selected from the group consisting of: an obround and a rounded rectangular.

9. The mounting bracket of any one of claim 1 further comprising at least one threaded stud component, the at least one threaded stud component received in at least one of the at least one plate bore and the at least one carriage bore.

* * * * *